(12) United States Patent
Marques

(10) Patent No.: US 6,182,066 B1
(45) Date of Patent: *Jan. 30, 2001

(54) CATEGORY PROCESSING OF QUERY TOPICS AND ELECTRONIC DOCUMENT CONTENT TOPICS

(75) Inventor: Joaquin M. Marques, Greenwich, CT (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/978,712

(22) Filed: Nov. 26, 1997

(51) Int. Cl.[7] ..................................... G06F 17/30
(52) U.S. Cl. ..................... 707/5; 707/6; 704/9; 704/10
(58) Field of Search ............... 707/3, 5, 6, 540, 707/10, 522; 709/200, 9; 704/10, 9; 711/100, 170

(56) References Cited

U.S. PATENT DOCUMENTS

| | | | | |
|---|---|---|---|---|
| 4,942,526 | * | 7/1990 | Okajima et al. | 704/10 |
| 5,181,163 | * | 1/1993 | Nakajima et al. | 704/10 |
| 5,325,298 | * | 6/1994 | Gallant | 704/9 |
| 5,649,186 | * | 7/1997 | Ferguson | 707/10 |
| 5,675,819 | * | 10/1997 | Schuetze | 704/10 |
| 5,774,888 | * | 6/1998 | Light | 707/5 |
| 5,778,363 | * | 7/1998 | Light | 707/5 |
| 5,887,133 | * | 3/1999 | Brown et al. | 709/200 |

* cited by examiner

*Primary Examiner*—Wayne Amsbury
*Assistant Examiner*—Thu-Thao Havan
(74) *Attorney, Agent, or Firm*—Steven J. Soucar; Anne Vachon Dougherty

(57) ABSTRACT

A system for tailoring user queries and for categorizing and searching metadata about content provided on the internet and/or intranet for delivery in accordance with customized user profiles. The method and system categorizes query content and document content to facilitate the collection, storage and usage of same. Query content and document content are tokenized, vectorized, and provided for comparison processing by the inventive method.

14 Claims, 2 Drawing Sheets

CATEGORY PROCESSING OF QUERY TOPICS AND ELECTRONIC DOCUMENT CONTENT TOPICS

FIELD OF THE INVENTION

This invention relates to the field of electronic content provision. More specifically, it relates to gathering related content from internet and intranet sources and providing access to same in response to user requests.

BACKGROUND OF THE INVENTION

A huge quantity of information is being continuously created and made available via electronic communications systems. There is so much information that it is simply not possible for an individual person to read it all. On the other hand, it is imperative that certain items of information reach certain people. Much of the electronically-provided news information ages rapidly, such that it loses its relevancy in a matter of days, or even a matter of hours (e.g., stock market information). Each person has different needs for information, and requires access to a different subset of the available information. In light of the foregoing, there is clearly a need for a system and method for rapidly accessing categorized electronic information.

One aspect of the problem arises because the information is being created in many different places. News articles about events in the world or business community, and articles written for newspapers, magazines and journals, can generally be obtained through various content providers, who frequently aggregate the information from a number of sources into single continuous electronic streams. No content provider today, however, provides access to all available information, so there is a trade-off between full access and complexity. Moreover, an individual user is frequently forced to subscribe to a host of services in order to obtain the information which is generated from different sources, in different countries, and in various languages. Subscribing to many services to some extent negates the benefits realized by the content aggregation by providers, since the user must then often filter through multiple copies of the same documents.

Internally, organizations face similar issues. Memos, announcements, documents of various kinds, and intranet web content are created at multiple locations throughout an organization, yet are generally not readily available to all members of the organization. Therefore, the process of collecting the information from all points of origins is a key issue, along with categorization and controlled dissemination of that information.

Another aspect of the problem is the actual matching process, comprising matching the collected and categorized content with an individual user's interests. For matching to work, an individual user must be able to express a diverse set of interests, not just one interest. A language of some kind is necessary to provide a medium for this expression of the user's interest. Further, a system is needed to capture the language and apply it to the items of information. Moreover, the language must embody some kind of high level semantic knowledge, since past word-search-based systems have fallen short of a satisfactory solution. The ability to express, capture and apply a person's interests or needs is a critical feature of the problem.

Finally, there is a need to deliver the information to people who have expressed an interest. The primary requisites for delivery are making sure that access to the information is convenient, even in dynamic situations, and making sure that delivery can occur quickly once the information becomes available. Moreover, people are increasingly mobile and have varied styles of working and of accessing and processing information. An effective delivery system will therefore require that the means of access be ubiquitous, that multiple means of access be available, and that delays in making the information available be minimized.

It is therefore an objective of the present invention to provide a system for gathering, categorizing, and delivering electronic content to users in response to user requests.

It is another objective of the invention to provide a system and method for gathering content from both inside (i.e., intranet) and outside (i.e., internet) sources and categorizing same for provision in response to customized user requests.

Yet another objective of the present invention is to provide a customer with the ability to embed user interest and delivery mechanisms into customer applications.

SUMMARY OF THE INVENTION

These and other objectives are realized by the present invention which provides a method and system for categorizing metadata about content provided via the internet or intranet; for categorizing user query content; and for matching and delivering categorized information tailored to customized user profiles.

BRIEF DESCRIPTION OF THE DRAWINGS

The invention will now be further detailed with specific reference to the appended Figures wherein.

DESCRIPTION OF THE PREFERRED EMBODIMENT

Figure 1:
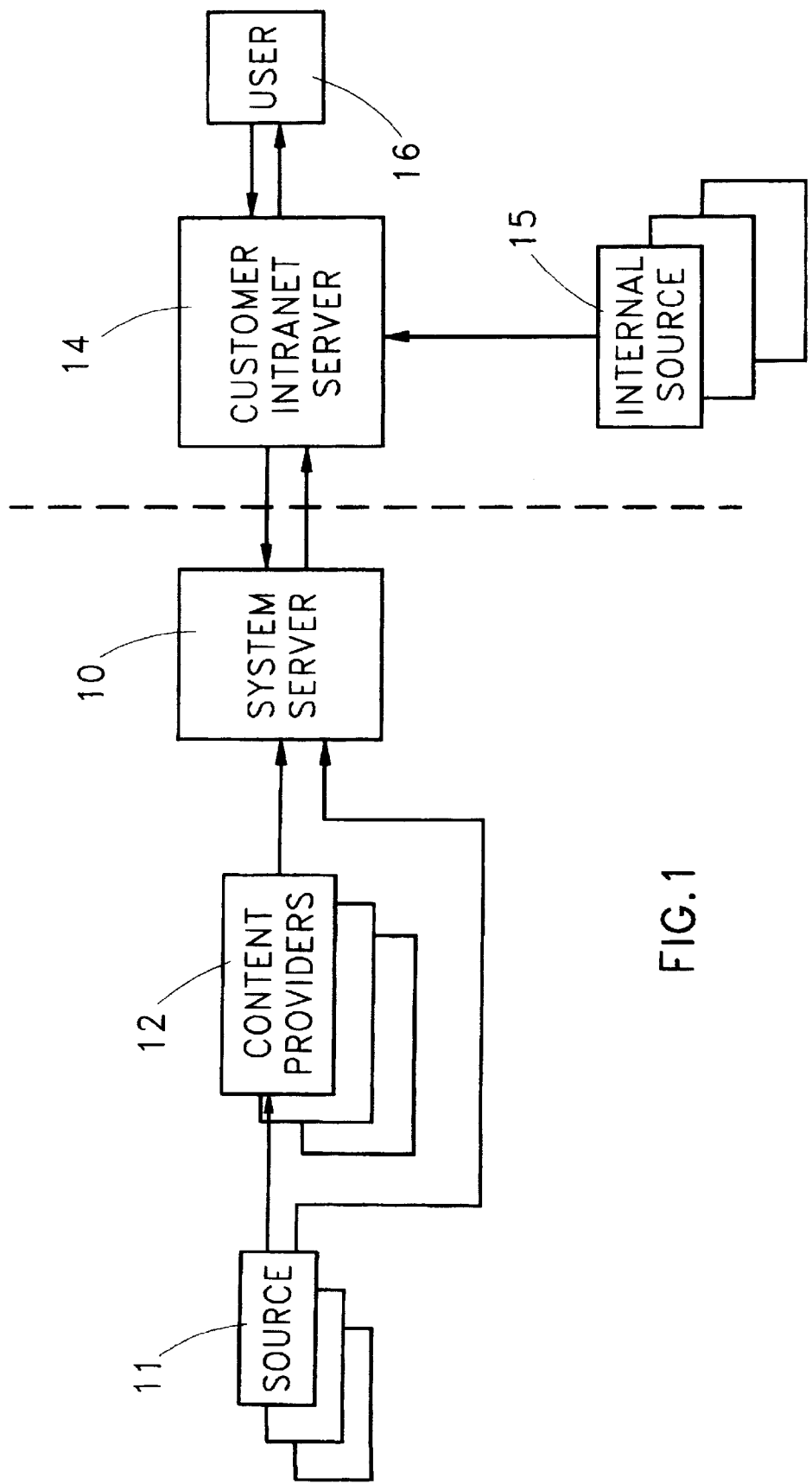
FIG. 1 provides a schematic illustration of an implementation of the present invention.

FIG. 1 provides a schematic overview of one implementation of the present invention. The implementation can be viewed as having two sides, an external side comprising the sources, content providers and System Server, and an internal side comprising the customer's site (including at least one server for the customer's intranet), internal sources and end user sites. As detailed therein, sources 11 provide electronic content (e.g., articles) on-line to content providers 12. The System Server, 10, gathers electronic content from content providers, as well as directly from sources, if necessary. At the System Server, the electronic content is categorized, with duplicate copies eliminated, and is stored in so-called "channels" of information. Each channel represents a particular category or group of categories of related information. The categorization of document content is generally done without reference to known user profiles or prejudices, although the categorization can be influenced by known or expected user query categories.

On the so-called "internal" side of the inventive system, the Customer Intranet Server 14, is in communication with not only the outside System Server, but also with internal sources 15 and at least one end user 16. The end users may be employees of the customer or clients of the customer who have contracted or otherwise arranged for receipt of information which has been accumulated, categorized, and disseminated from the Customer Intranet Server site 14.

An end user 16 will specify the areas of interest for which that end user wishes to obtain electronic information. Unlike prior art systems which allowed only minimal user query input, often limited to single word entries for simple word searching, the present system assembles a complex user query including the specification of multiple disparate topics of interest. The user profile is created by system components which are located at the Customer Intranet Server 14. "Creation" of the user profile involves not only the extension of user-input language, but also the elimination of non-critical language, inclusion of semantic knowledge, and cross-relating of user interest topics. Query development is further detailed below. Once the user profile has been developed, it is stored at the Customer Intranet Server for matching to assembled and categorized content. The system can be programmed to conduct on-going matching (i.e., checking every new document entry for a match with the user profile), periodic matching (e.g., every 12 hours), or matching only upon user prompting (e.g., only when a user connects to the Customer and asks for an update).

Continual or periodic categorization of external electronic content is the task of the system components which can be located at the System Server 10. The System Server receives input from the content providers 12, as well as possibly from the internal sources 15 via the Customer Intranet Server 14. Receipt of input from both external and internal sources can be a passive process, whereby the documents are continuously or periodically supplied to the System Server, or an active process, whereby system crawler components seek out the documents.

The inventive system preferably includes provision to the customer site of at least one internal crawler which will provide a totally automated way to bring their entire distributed network resources into the system. The crawlers crawl through a customer's internal network and retrieve documents from various sources, distinguished by the technologies which were used to store the information.

Documents from the internal sources are assembled and categorized at the Customer Internet Server, where a Channel Map is created containing a list of web servers, directories and other targets which have been or are to be crawled. A Channel Map can be constructed at the System Server as well. Each entry in the Channel Map may include a list of channels in which web pages and documents from the respective server and directory are to appear. Table 1 provides a sample Channel Map for a fictitious semiconductor manufacturer:

| TYPE | SERVER | DIRECTORY | CHANNELS |
| --- | --- | --- | --- |
| Web | HR | /publish/benefits/401k | 401k |
| Web | HR | /publish/jobopenings | Jobs |
| Web | Marketing | /publish/product/specs | Product Specs |
| Web | www.badco.com | /pub/productspecs | Competition Specs |
| Web | www.goodco.com | /pub/products/electrnic | Customer Products |
| PCFile | engineering | /projects/chipdesigns | Chip Designs |
| PCFile | marketing | /reports/companalysis | Competitive Anly. |
| FTP | engineering | /projects/status | Status Reports |
| Notes | engineering | /specs/chipspeed | A1200 Design |

Figure 2:
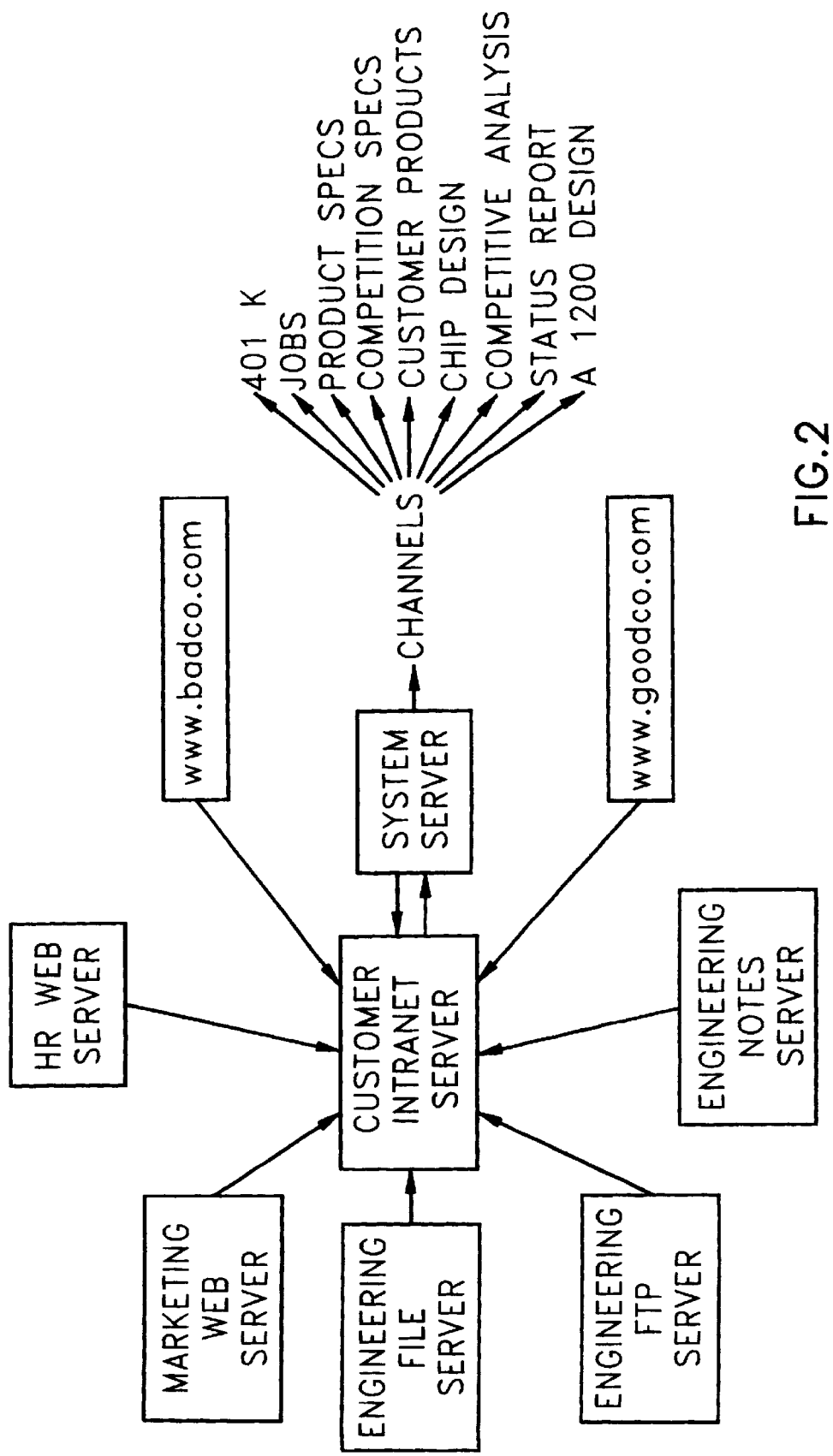
FIG. 2 provides a schematic illustration of the intranet side of one embodiment of the inventive system.

FIG. 2 provides a schematic illustration of the sources accessible to the Customer Intranet Server of the fictitious company, directly or through the System Server, and the channels that result from receiving or crawling those sources. Information gathered from external sources will also be mapped to the established channels, so that an end user can readily access all relevant information in a category or channel as the result of a single query.

While some amount of categorization may be straightforward, such as those above-noted examples wherein any information obtained from a certain source will necessarily be provided on a given channel (i.e., with sites or site directories being mapped to the channels), the bulk of document categorization requires intensive analysis of the document contents. In addition to the crawlers which automatically funnel documents obtained from certain sources into pre-established channels, there are two other primary means by which documents are categorized. The first, and most rudimentary, is categorization by manual user interface, whereby a system administrator (or even document author) identifies the document to be loaded into the server and identifies the channels in which the document is to appear. The second, more complex, means is automatic categorization by content filtering, which is conducted by system components located at either the Customer Intranet Server or the System Server 10, the details of which are further provided below and in co-pending applications, Ser. No. 08/979,248, entitled "Method and System for Electronic Document Content or Query Content Filtering", and Ser. No. 08/980,075, entitled "Content Filtering for Electronic Documents Generated in Multiple Foreign Languages", which are assigned to the present assignee, and are being filed on even date herewith. Such automatic categorization can also be utilized at the Customer Intranet Server for the purpose of categorizing internal documents into channels, which may match or be unique from the channels provided by the System Server. Such channel definitions can be applied as well to documents received from the System Server to fill the customer-defined channels with news or other external documents. After query processing and document content categorization, it is preferable to analyze the categories to ascertain if other relationships exist among the categories, which relationships themselves may be identified as new categories or channels, which is the subject of the present invention. The foregoing co-pending applications are incorporated by reference herein, as is co-pending patent application Ser. No. 08/979,861 entitled "Method and System for Providing Access to Categorized Information from OnLine Internet and Intranet Sources," which is assigned to the present assignee.

Once documents from both the internal and external sources have been categorized/assigned channels, both the documents and the assigned channels are stored in a local database at the Customer Intranet Server or associated customer location. Inventive components at the Customer Intranet Server match the channels assigned to each of the incoming documents with the user's interests as found in the user profile. Each document is then made available for access by, or is sent to, the user whose interests it matches.

The System Server's above-noted functions may be provided as part of a customer intranet, wholly outside of the customer domain, or divided in function between the two locations. In the "outside" example, all document collection and categorization would be done at the System Server as a service of the provider. Documents found on the external internet, as well as those which may be supplied from the customer's own intranet and/or databases, would be analyzed and categorized at the provider location. In the instance where the customer wishes to additionally be a provider to end users, two alternative scenarios are possible. Under the first scenario, an outside provider would still assemble and categorize documents from outside sources and make them available at the customer's server. The customer's server would also be adapted to perform assembly and categorization of "in-house" documents, merging of the in-house assemblage with the categorized documents from outside sources, matching the resultant merged documents to user request profiles, and disseminating the matching results to the user. The second alternative implementation would locate all categorization functionality at the customer location. In all three implementations, the customer location would retain the capability for receipt of user request input, creation and storage of the user profile, matching of the user profile to the categories or channels into which the documents are placed, and provision of the matched documents for end user review.

The customer site is provided with the capability for building applications to create a series of different user interfaces with different interaction means, different restrictions for user access (e.g., providing some users access to only documents from outside sources, while others would have access to both externally-obtained and internally-generated documents), and different levels of query and content complexity.

For the detailed descriptions of the processing "stages," including user query analysis and profile creation, document categorization, and matching, it is to be noted that the same types of analyses can frequently be applied at each stage. For example, finding relationships between two seemingly disparate user query subject categories can parallel the effort to identify commonality of subject matter from two input documents, as well as a subsequent effort to match the profile to a category/channel. Therefore, where appropriate, the ensuing processes will reference one, two or all of profile analysis, document content categorization, and matching stages.

Users of the system initially specify which topics are of interest. This specification takes the form of a simple subscription to pre-defined user categories, a modified subscription whereby the user can alter or add to the pre-defined user categories, a user-customized set of queries, or any combination of the foregoing. Each query represents a topic, and can additionally contain boolean, fuzzy, proximity and/or hierarchical operators. A set of topics preferred by a user is know as a user profile. The present method reduces each query to one or more vector entries with the entry's index into the vector corresponding to a hash of the query's textual expression of the importance of that query to the overall topic/profile. A query can be either a single token (word or phrase) or a combination of tokens which includes boolean, fuzzy, proximity and/or hierarchical operators. Token IDs are assigned to each query item as hereinafter detailed.

Automatic query processing, as well as document content categorization, is optimized in the present invention by first tokenizing the content thereof. In such a tokenization process, all the word/phrases are first identified as units, then stemmed. After all stop words and phrases are filtered out, only a few of the original word/phrases are left. These surviving words/phrases are called tokens. The tokens are usually just the stems of the original words, or made-up labels which correspond to phrases. The stems or made-up labels are referred to as "terms". Terms are strings, and since the system must handle quite a few thousand terms, the total memory which can be consumed by terms could take up a significant amount of computer memory. Therefore, a hash function is provided to assign unique token IDs to the terms (which may also consist of expressions containing words and phrases as terms combined with a variety of query operations) found in the documents and queries. The term strings are replaced by 32 bit integers. A "reverse dictionary" can be maintained which comprises a lexicon with token IDs as the keys and the words, phrases, queries as the values. However, if the need is to mark the document with categories, and not to catalog and retrieve based on the specific tokens matched, a lexicon will not be needed. Clearly, when comparisons are being made, comparisons of 32 bit integers will be significantly faster than the prior art string comparisons. Textual messages are likewise mapped to vectors using the same procedures as were used for the topics, above. All vectors are then normalized. Classification and matching are thereby reduced to vector processing.

Query processing suffers from the drawback that, even with tokenizing and vectorizing, a great deal of redundancy may be contained in large query sets. The redundancy increases CPU and memory consumption requirements for any of the categorization processes based on the query sets. Query processing can be streamlined by recognizing possible hierarchical relations between queries in a set that has been previously indexed and vectorized, some of which may correspond to known topic categories or channels. In order to streamline the query processing, after vectorization, the following steps are implemented:

First, one calculates the cosine measure (dot product) of every query vector against every other vector. This will provide a similarity measure of every query against every other query in the database. The system stores all similarity measures that equal or exceed a pre-set threshold in a sparse matrix. Those query vectors having similarity measures with scores below the threshold are assumed to have nothing in common, and therefore, are assigned an implicit similarity measure equal to zero.

Standard clustering methods are applied to the sparse matrix of similarity measures. Applying a second threshold, the clusters are divided into two groups comprising (a) clusters of vectors whose similarity measures exceeds or equals the second threshold; and (b) clusters of vectors whose similarity measures do not exceed the second threshold. Membership in group (a) or (b) is determined by comparison to a predefined similarity threshold say, for example, 60%. Thus, those queries in a cluster that share greater than or equal to 60% of their tokens belong to group (a), while those that don't belong to group (b). The differences between groups (a) and (b) is that the queries in (b) are not as strongly related as those in (a).

The query vectors in group (a) share most of their terms. When shown a cluster of such queries, the information analyst must ask the following questions: "Are these queries related to one another?"; "If they are related, are they part of the same branch or related branches in the topic hierarchy?"; "If they are not currently related to one another, should they be related?"; "If so, what is the best way to relate them?"; and, "If they should not be related, what is the best way to avoid this clustering (overlap) of queries and of discriminating between them in the future?".

The queries in groups (a) and (b) may indicate to the information analyst: new links between previously unrelated pre-existing categories (forming new hierarchy branches); a strengthening in the links between previously related categories (consolidation and strengthening of existing hierarchy branches); or, new links between pre-existing categories and entirely new categories (again, forming new hierarchy branches). If any bogus links are discovered between totally unrelated queries, those links must be avoided by refining/enhancing the queries.

Using the results of the clustering process, the information analyst can be presented with a list of queries in each cluster in group (a) or (b) and decide whether the queries truly have anything in common or not. If the queries already belong in branches of the same hierarchy, their tags will make this fact obvious, and the analyst may skip further analysis. If, on the other hand, the tags do not show any relationship between the queries, the analyst may decide that further analysis of the individual queries is required.

Finally, if two or more queries in a cluster have quite a few things in common, the common terms can be made into a single query vector and this query vector can be replaced by a single term in all of the original queries. This single replacement term corresponds to and represents the new query vector. The foregoing procedure will reduce the amount of redundancy in the system. Of course, the information analyst must first decide that the terms involved are truly common to all the queries and that those terms will likely remain common throughout the life of the queries before consolidating them into a common query vector.

In a similar manner, vector clustering can be utilized to automatically find new topic categories among the document content categories. Again assuming that all documents have been pre-indexed and converted into normalized vectors, one calculates the cosine measure (dot product) of every document vector against every other document vector. This will provide a similarity measure of every document against every other document in the database. The system stores those similarity measures that equal or exceed a preset threshold in a sparse matrix. Those documents vectors having similarity measures with scores below the threshold are assumed to have nothing in common, and therefore are assigned an implicit similarity measure equal to zero.

Once again, standard clustering methods are applied to the sparse matrix of similarity measures. Each cluster produced will fall into one of the following groups: (A) document vectors in the cluster mostly share common pre-existing category tags; (B) document vectors in the cluster share some common pre-existing tag categories; (C) document vectors in the cluster share no category tags. The documents in group (A) closely match well known, pre-existing categories. Thus, at first sight, they hold little interest to information analysts. But, on further analysis, the analyst may find that much can be learned from this group. For example, the analyst may ask: how closely related are these pre-existing categories that they show up in almost every document in the group?

The document in groups (A) and (B) may indicate: new links between previously unrelated pre-existing categories; a strengthening in the links between previously related categories; or, new links between pre-existing categories and entirely new categories. The documents in group (C) indicate the existence of previously unknown categories and of links between them. This is the most important category for the information analyst.

For each cluster found, and for each group of documents of type (A) and (B) within that cluster, and for each matched category within a group, a summary vector is calculated from all the document vectors in the group matching that category. A summary vector is a single vector that best represents a cluster of neighboring document vectors. It represents the average vector in the cluster and is calculated by taking the centroid of all of the vectors in the cluster. This summary vector is refined by a process of comparison with other summary vectors. The final, refined summary vector represents the query which will retrieve those document with the highest recall and precision possible when issued against the corpus of documents stored in the document database. This new query vector is then compared to the one associated with the original category, to determine to what extent they match. After this process, if there is enough of an overlap, an improved version of the original query vector associated with the category is produced. If, on the other hand, they only partially overlap, a new category and query is produced together with an improved version of the original query vector associated with the original category. The new link between them is implicit in the terms which both query vectors share.

For each cluster found, and for each group of document of type (C) within that cluster, a summary vector is calculated from all the document vectors in the group. This summary vector is refined by the process of comparison with other summary vectors. The final, refined summary vector represents the query which will retrieve those documents with the highest recall and precision possible when issued against the corpus of documents stored in the document database. This query also represents a new category.

Every new category requires a new tag/label that best represents that category. This tag is put together initially by concatenating the most representative (i.e., highest score) terms of the query associated with the category. A quick scan of the text of documents retrieved by the query will locate those representative terms in their original context, will determine if those terms are part of any collocations which are not part of any term yet, and, if so, will replace those terms in the label with their most common collocations. The final label is scanned by a small parser specializing in noun and verb phrases as may appear in a category label, to make sure that it is syntactically correct. Refined categories have their labels/tags enhanced by a process identical to the one described immediately above.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for categorizing electronic document content of a plurality of documents for matching to user requests comprising the steps of:

parsing said document content into a plurality of items, each of said items comprising a contiguous phrase of more than two words located within said document;

assigning each of said plurality of items at least one of a plurality of token IDs;

vectorizing said plurality of token IDs into a plurality of document vectors;

calculating the cosine measure of each of said document vectors against each other of said document vectors to provide a plurality of similarity measures, one similarity measure for each document against each other of said plurality of documents.

2. The method of claim 1 further comprising the steps of:

comparing each of said similarity measures to a pre-set threshold.

3. The method of claim 2 further comprising storing each of said similarity measures which exceeds said pre-set threshold in a sparse matrix.

4. The method of claim 3 further comprising clustering said stored similarity measures in a plurality of clusters according to said cosine measures.

5. The method of claim 4 further comprising calculating a summary vector for each of said plurality of clusters.

6. The method of claim 5 further comprising the steps of:

identifying said summary vector as representing a new category for said documents in said cluster; and creating a new category tag for said documents in said cluster.

7. A method for categorizing user input query content for matching user requests to electronic document content comprising the steps of:

parsing said query content into a plurality of items, each of said items comprising a contiguous phrase of more than two words located within said document;

assigning each of said plurality of items at least one of a plurality of token IDs;

vectorizing said plurality of token IDs into a plurality of query vectors;

calculating the cosine measure of each of said query vectors against each other of said query vectors to provide a plurality of similarity measures, one similarity measure for each query against each other of said plurality of queries.

8. The method of claim 7 further comprising the steps of:

comparing each of said similarity measures to a pre-set threshold.

9. The method of claim 8 further comprising storing each of said similarity measures which exceeds said pre-set threshold in a sparse matrix.

10. The method of claim 9 further comprising clustering said stored similarity measures in a plurality of clusters according to said cosine measures.

11. The method of claim 10 further comprising calculating a summary vector for each of said plurality of clusters.

12. The method of claim 11 further comprising the steps of:

identifying said summary vector as representing a new category for said queries in said cluster;

graphically presenting said clusters for human analysis; and creating a new category tag for said queries in said cluster.

13. A method for categorizing electronic document content of a plurality of documents for matching to user requests comprising the steps of:

parsing said document content into a plurality of items, each of said items comprising one of a word or a contiguous phrase of words located within said document;

assigning to said plurality of items at least one of a plurality of token IDs, said token IDs representing a plurality of items;

vectorizing said plurality of token IDs into a plurality of document vectors;

calculating the cosine measure of each of said document vectors against each other of said document vectors to provide a plurality of similarity measures, one similarity measure for each document against each other of said plurality of documents.

14. A method for categorizing user input query content for matching user requests to electronic document content comprising the steps of:

parsing said query content into a plurality of items, each of said items comprising one of a word or a contiguous phrase of words located within said document;

assigning to said plurality of items at least one of a plurality of token IDs, each of said token IDs representing a plurality of items;

vectorizing said plurality of token IDs into a plurality of query vectors; and calculating the cosine measure of each of said query vectors against each other of said query vectors to provide a plurality of similarity measures, one similarity measure for each query against each other of said plurality of queries.

* * * * *